US009729435B2

(12) United States Patent
Muscariello et al.

(10) Patent No.: US 9,729,435 B2
(45) Date of Patent: Aug. 8, 2017

(54) TECHNIQUE FOR COMMUNICATION IN AN INFORMATION-CENTERED COMMUNICATION NETWORK

(71) Applicant: Orange, Paris (FR)

(72) Inventors: Luca Muscariello, Chatenay-Malabry (FR); Giovanna Carofiglio, Chatenay-Malabry (FR)

(73) Assignee: ORANGE, Paris (FR)

( * ) Notice: Subject to any disclaimer, the term of this patent is extended or adjusted under 35 U.S.C. 154(b) by 34 days.

(21) Appl. No.: 14/404,789

(22) PCT Filed: May 17, 2013

(86) PCT No.: PCT/FR2013/051098
§ 371 (c)(1),
(2) Date: Dec. 1, 2014

(87) PCT Pub. No.: WO2013/178910
PCT Pub. Date: Dec. 5, 2013

(65) Prior Publication Data
US 2015/0146737 A1    May 28, 2015

(30) Foreign Application Priority Data
May 29, 2012  (FR) ..................... 12 54943

(51) Int. Cl.
*H04L 12/721*  (2013.01)
*H04L 12/801*  (2013.01)
(Continued)

(52) U.S. Cl.
CPC .............. *H04L 45/44* (2013.01); *H04L 47/19* (2013.01); *H04L 47/32* (2013.01); *H04L 49/30* (2013.01); *H04L 67/327* (2013.01)

(58) Field of Classification Search
None
See application file for complete search history.

(56) References Cited

U.S. PATENT DOCUMENTS 6,813,767 B1 *  11/2004  Willke ................ G06F 13/36
                                                710/107
2005/0083973 A1    4/2005  Krishnan
(Continued)

FOREIGN PATENT DOCUMENTS

WO        02089014 A1    11/2002

OTHER PUBLICATIONS

International Preliminary Report on Patentability and English translation of the Written Opinion dated Dec. 2, 2014 for corresponding International Application No. PCT/FR2013/051098, filed May 17, 2013.

(Continued)

*Primary Examiner* — Diane Lo
(74) *Attorney, Agent, or Firm* — David D. Brush; Westman, Champlin & Koehler, P.A.

(57) ABSTRACT

A communication method is provided, which is implemented by a routing device in an information-centered communication network. The method includes the following steps to process a request relative to a data segment from a given stream, the request being routed on a link of the routing device: checking that an input bit rate for said link is higher than a threshold, the input bit rate for the link corresponding to that which is necessary for the device to receive, by using the link, a set of data segments corresponding to pending requests; and timing the request to be routed. The threshold may correspond to the bit rate available on this link at the device input, or the input bit rate may be determined for pending requests related to data segments from the given stream, and the threshold may correspond to a fair bit rate, for example.

11 Claims, 3 Drawing Sheets

(51) Int. Cl.
  *H04L 12/823* (2013.01)
  *H04L 12/935* (2013.01)
  *H04L 29/08* (2006.01)

(56) References Cited

U.S. PATENT DOCUMENTS

| | | | | |
|---|---|---|---|---|
| 2008/0084896 | A1* | 4/2008 | Fleury | H04L 29/06027 370/468 |
| 2013/0060962 | A1* | 3/2013 | Wang | H04L 67/327 709/238 |
| 2013/0219081 | A1* | 8/2013 | Qian | H04L 67/327 709/241 |
| 2013/0275567 | A1* | 10/2013 | Karthikeyan | H04L 41/0816 709/221 |

OTHER PUBLICATIONS

International Search Report and Written Opinion dated Sep. 12, 2013 for corresponding International Application No. PCT/FR2013/051098, filed May 17, 2013.
Van Jacobson et al., "Networking Named Content", Published CoNEXT'09, Dec. 1-4, 2009 (Dec. 1, 2009), Rome Italy.

\* cited by examiner

TECHNIQUE FOR COMMUNICATION IN AN INFORMATION-CENTERED COMMUNICATION NETWORK

CROSS-REFERENCE TO RELATED APPLICATIONS

This application is a Section 371 National Stage Application of International Application No. PCT/FR2013/051098, filed May 17, 2013, the content of which is incorporated herein by reference in its entirety, and published as WO 2013/178910 A1 on Dec. 5, 2013, not in English.

FIELD OF THE DISCLOSURE

The invention relates to a communication technique in an information-centric communication network, implementing a named routing.

BACKGROUND OF THE DISCLOSURE

The article by Van Jacobson et al, entitled "Networking Named Content" and published in 2009 in the proceedings of the CoNEXT '09 conference presents a new content-centric architecture, called "Content-Centric Networking". This architecture proposes changing the current communication model based on physical addressing in the network to a new communication model based on addressing by content name.

A stream can be supplied for different applications, real time or not, and is identified in the communication network by a stream name or identifier. A stream is made up of data segments. For its part, a data segment is identified by a segment number and the stream identifier.

More specifically, to obtain a data segment of a stream, a client entity transmits a request relating to this data segment, called "Interest Packet". Upon reception of this request, a routing node checks to see if it has the data segment sought. If such is the case, it then transmits it to the interface via which the request was received, thus to the client entity, if appropriate via other routing nodes. If it does not have the data segment sought, it checks in a pending requests table PIT (Pending Interest Table), to see if it has already transmitted a request relating to the same data segment. If such is not the case, it stores, in the pending requests table PIT, the identifier of the data segment sought in association with an identifier of the interface via which the request relating to the data segment sought was received. It then routes the request in the communication network as a function of the stream identifier. Otherwise, that is to say when the pending requests table already contains the identifier of the data segment sought, it does not transmit the request received but associates, in the pending requests table PIT with the identifier of the data segment sought, an identifier of the interface via which the request was received. When the routing node receives the data segment sought, it retransmits it to all the interfaces via which requests relating to this data segment have been received, ultimately to all the client entities having requested it.

In the case of congestion provoked for example by an excessive volume of data segments to be routed, a routing node will not be able to immediately transmit one or more data segments. This or these segments will then be stored in queue, possibly even deleted when the latter is saturated. It is found that, in this type of communication network, the role of each routing node is to aggregate the requests relating to one and the same data segment of a stream. The absence of routing of a data segment has the effect, by virtue of the aggregation function of the routing nodes, of not satisfying a plurality of client entities having requested the latter. The number of client entities concerned depends on a degree of aggregation applied in the processing of the requests relating to a data segment of the stream. It should be recalled here that, in the conventional communication model, in a communication network with physical addressing, only one client entity is affected by the deletion of a packet or data segment that it has requested.

SUMMARY of the aims of the invention is to remedy inadequacies/drawbacks of the prior art and/or to provide enhancements thereto.

According to a first aspect, the subject of the invention is a communication method implemented by a routing device in an information-centric communication network. This method comprises the following steps implemented to process a request concerning a data segment of a given stream, this request having to be routed over a link to the routing device:

- a step of checking that an input bit rate for said link is above a threshold, the input bit rate for said link corresponding to that needed for reception, by the device by means of said link, of the requested data segment and of a set of data segments corresponding to pending requests;
- a step of time-delaying said request to be routed.

Applications transmit data segments relating to a stream. These are for example applications such as real-time content broadcasting services, on-demand or even "live". They can also be telephony applications. There is no limitation as to the type of application.

Such data segments can be objects or even pieces of objects or even packets.

The communication network is a content- or information-centric network. It thus implements a routing by name and aggregates requests relating to a data segment of a stream. In this type of communication network, the routing device is able to aggregate a plurality of requests relating to a data segment of a stream in another request and thus transmits only a single request for a data segment.

Hereinbelow, a request relating to a data segment transmitted by a routing device to another routing device, determined using the routing table, is said to be output from the device. The data segment received in response by the routing device from this other routing device is said to be input for the routing device.

A request or enquiry relating to a data segment is said to be routed, when the pending requests table does not contain the identifier of the data segment, that is to say no request is current or pending for this data segment.

An active stream is a stream for which at least one request or enquiry relating to a data segment of this stream is pending. The pending requests table thus contains an identifier of a data segment of the stream.

Thus, by virtue of the invention, the communication method makes it possible to regulate, for a given link, the transmission of the requests relating to data segments output from the routing device as a function of a bit rate expected at the input of this device. This communication method is particularly well suited to a content- or information-centric communication network. In effect, a requested data segment necessarily follows the same path as that of the corresponding request, unlike in the communication networks with physical addressing.

In order to time-delay a request, a queue is provided on the routing device. It is stressed here that a request is of a size much smaller than the data segment whose reception it requests. Thus, the memory space needed to manage the queue is very much less than that which would be necessary, according to the known techniques, to store data segments in the event of congestion.

The different embodiments or features mentioned hereinbelow can be added independently or in combination with one another, to the steps of the communication method as defined previously.

According to a particular feature, the communication method further comprises a step of obtaining information relating to a volume of the requested data segment.

The information relating to the volume of the data segment can be obtained from the request itself or by any other means. It makes it possible to reliably approximate the input bit rate for each of the active streams and thus enhance the efficiency of the communication method.

In a first particular embodiment, this threshold corresponds to the bit rate available on said link at the input of said device.

In a second particular embodiment, the input bit rate is determined for the pending requests relating to data segments of the given stream and said threshold corresponds to an equitable bit rate.

An "equitable bit rate" is an equitable allocation, between the different active streams, of the bit rate available on this link at the input of the routing device.

In this second embodiment, for a link and for a cycle, the requests relating to data segments of a stream for which the bit rate expected at the input has not exceeded the equitable bit rate are transmitted without delay; still for this link, the requests relating to data segments of a stream for which the bit rate expected at the input has exceeded the equitable bit rate are time-delayed and are transmitted subsequently as a function of the residual bit rate, corresponding to the difference between the available bit rate and the overall bit rate expected on the link at the input for all the pending requests of the active streams.

The equitable allocation of the bit rate makes it possible also to guarantee, for all the active streams, an equitable access to the link at the input of the routing device and not give preference to the streams for which groups of requests are transmitted. The communication network is thus protected in the event of distribution of such streams. Furthermore, requests relating to data segments belonging to streams for which the input bit rate is below the equitable bit rate are routed without delay.

The efficiency of the method in this second embodiment is thus enhanced.

According to a particular feature, the communication method comprises:
- for an active stream, a step of incrementing a credit allotted to said active stream as a function of the equitable bit rate, and
- a step of decrementing the credit allotted to the given stream as a function of information relating to a volume of the requested data segment.

The use of a counter makes it possible to simply determine the consumption of the equitable bit rate associated with an active stream.

According to another particular feature, the checking step consists in checking that the given stream has exceeded the equitable bit rate or that at least one request of the given stream is time-delayed.

According to a particular feature of the method, the time-delay step consists in storing the request to be routed in a queue and in extracting said request to route it over said link as a function of a residual bit rate, determined as a function of the input bit rate on said link.

Thus, the residual bit rate is used to transmit the requests stored in the queue. The requests have thus been time-delayed for a variable time, this time depending on the residual bit rate.

According to another particular feature, the residual bit rate is divided up between the active streams having time-delayed requests.

According to a second aspect, the invention also relates to a routing device in an information-centric communication network. This routing device comprises the following means, activated to process a request relating to a data segment of a given stream, said request having to be routed over a link of the routing device:
- means for determining an input bit rate for said link, the input bit rate for said link corresponding to that needed for reception, by the device by means of said link, of said requested data segment and of a set of data segments corresponding to pending requests;
- checking means, arranged to check that the input bit rate is above a threshold;
- time-delay means, arranged to time-delay said request to be routed, in the case of a positive check.

According to a third aspect, the invention further relates to a communication network, comprising a routing device as described previously.

According to a fourth aspect, the invention relates to a program for a routing device, comprising program code instructions intended to control the execution of steps of the method previously described, when said program is run by said device and a storage medium that can be read by a routing device on which a program for a routing device is stored.

BRIEF DESCRIPTION OF THE DRAWINGS

The invention will be better understood using the following description of particular embodiments of the method of the invention, with reference to the attached drawings in which.

DETAILED DESCRIPTION OF ILLUSTRATIVE EMBODIMENTS

Figure 1:
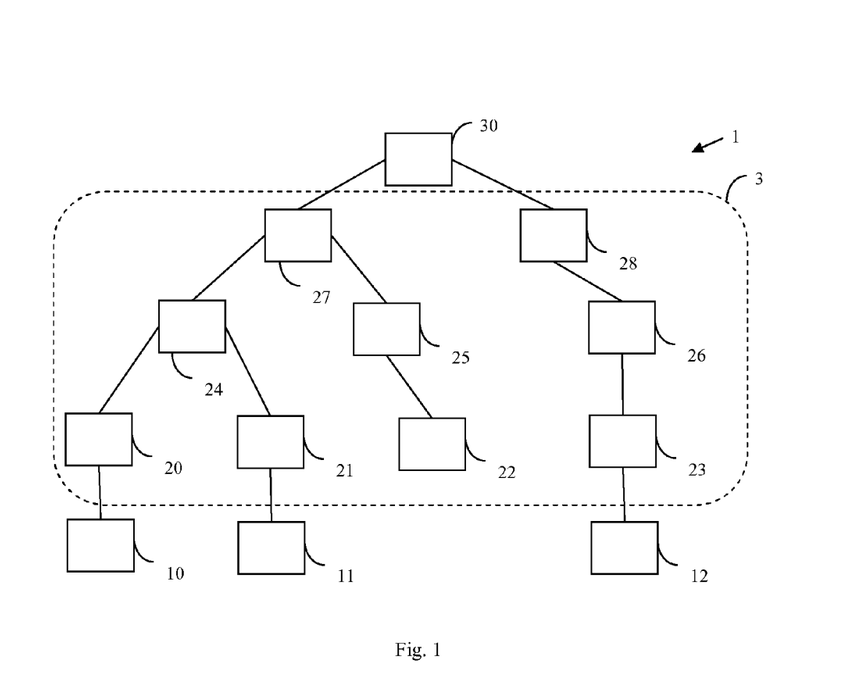
FIG. 1 represents an information-centric communication network.

FIG. 1 represents a communication network 1 enabling client entities 10, 11, 12 to access different applications such as television, video on demand, and the Internet. Each client entity 10, 11, 12 is linked to an access network 3. The latter enables the client entities to access the applications implemented by servers, one of which, the server 30, is represented in FIG. 1.

When a client entity 10-12 accesses a given application implemented by the server 30, data segments relating to this given application are exchanged from the server 30 to the client entity 10-12. Such data segments can be objects or else pieces of objects or even packets.

It can concern browsing on a website comprising data segments. It can also concern a content broadcasting application, for example in an architecture of CDN (Content Delivery Network) type.

Hereinbelow, the particular case will be taken in which the communication network 1 is an information-centric network ICN. As a nonlimiting example, the communication network implements name-based addressing mechanisms, such as those described in the article by Van Jacobson et al., entitled "Networking Named Content", mentioned previously. Such a communication network is also called content-centric network CCN. As a nonlimiting example, according to this article, a stream identifier Id_F is organized as follows:
- a prefix, corresponding to a routable name, for example "parc.com",
- a name in the organization, for example "videos/WidgetA.mpg".

A data segment belonging to a stream is identified by the stream identifier, time information and information relating to the segment number.

According to this example, the data segment is identified "/parc.com/videos/WidgetA.mpg/_v <timestamp>/_s3".

In a particular embodiment, information relating to a volume of the data segment is associated with the identifier of the data segment. This information is, for example, supplied in the form of a number of bytes forming the data segment. There is no limitation on how this information is obtained. It is for example possible to obtain it from a file describing the content. It is also possible to obtain it from the first data segment of the stream.

More specifically, a client entity 10 transmits one or more requests relating to data segments. In the particular case where the server 30 has these data segments, the latter transmits them to the client entity 10. The data segments then pass through the access network 3 to the client entity.

Figure 4:
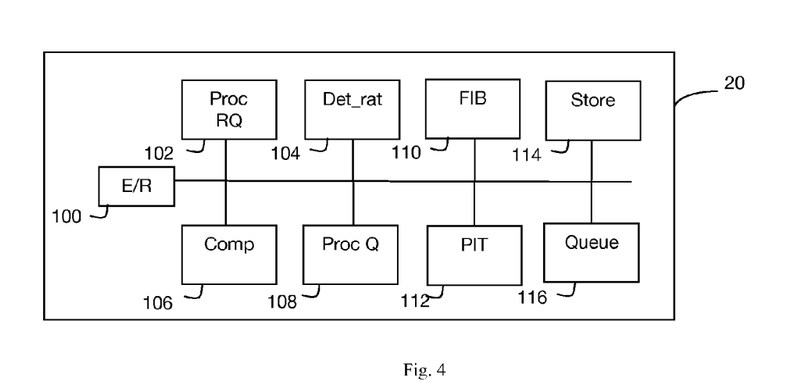
FIG. 4 represents a routing device according to a particular embodiment of the invention.

The access network 3 comprises routing devices 20-28. These routing devices 20-28, one of which, the routing device 20, is represented in FIG. 4, notably comprise, in this type of communication network, three data structures:
- a first table 110, called routing table FIB, standing for "Forwarding Information Base", arranged to store routing data, more specifically a list of interfaces associated with a prefix;
- a second table 112, called pending requests table PIT, standing for "Pending Interest Table", arranged to store a list of interfaces via which one or more requests relating to a data segment of a stream have been received, as long as this data segment has not been received in response (the request then being pending);
- storage means 114, called content store, arranged to store data segments.

Such a routing device can be a router of the network, a network access gateway, an access multiplexer element.

As represented in FIG. 1, the client entity 10 is linked to the routing device 20. The client entity 11 is linked to the routing device 21. The routing devices 20 and 21 are linked to the routing device 24. The routing device 22 is linked to the routing device 25. The routing devices 24 and 25 are linked to the routing device 27. The client entity 12 is linked to the routing device 23, which is in turn linked to the routing device 26, linked to the routing device 28. The routing devices 27 and 28 are linked to the server 30. It is stressed here that this is an illustrative example and there is no limitation attached to this representation.

The client entity 10 wanting to obtain a data segment of a stream transmits a request IP, standing for "Interest Packet", relating to this data segment. The request is received by the routing device 20. If it does not have the requested data segment in the content store 114, the routing device 20 then uses the pending requests table 112 to check whether it has already transmitted a request from another client entity relating to this data segment. If such is the case, it adds to the pending request table an identifier of the interface via which it received the request, in association with an identifier of the data segment sought. If it has not yet transmitted any request relating to this data segment, the routing device 20 stores, in the pending requests table 112, the identifier of the data segment in association with an identifier of the interface via which it received the request. Then, it routes the request to the routing device 24 using the routing table 110. The routing table 110 thus makes it possible to determine an output link from the routing device, over which the request will be routed. The request is thus propagated in the communication network 1, until a routing device or else the server 30, having the data segment sought, transmits it. When the routing device 20 receives as input the requested data segment, it retransmits it on all the interfaces via which requests relating to this data segment have been received, ultimately to the all client entities having requested it. It should be noted that, in this way, a tree structure is established through the pending requests tables 112 from the client entities 10-12 to the server 30.

Consequently, a request relating to a data segment is said to be routed, when the pending requests table does not contain the identifier of the data segment, that is to say that no request relating to this data segment has been transmitted as output from the device and is awaiting response.

The routing devices 20-28 comprise at least one queue 116, arranged to store requests relating to data segments.

Figure 2A:
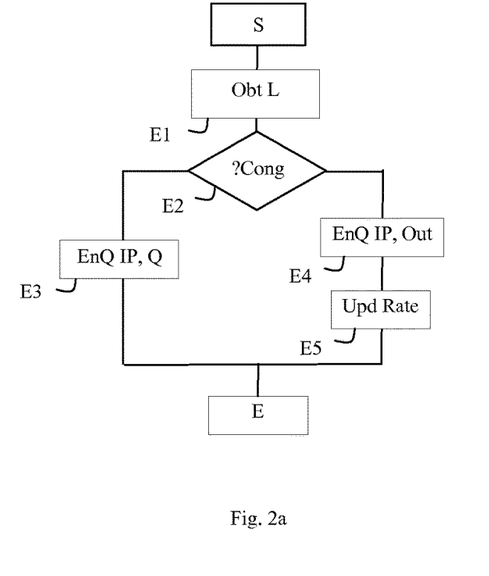
FIGS. 2a and 2b represent steps of the method according to a first particular embodiment of the invention.
Figure 2B:
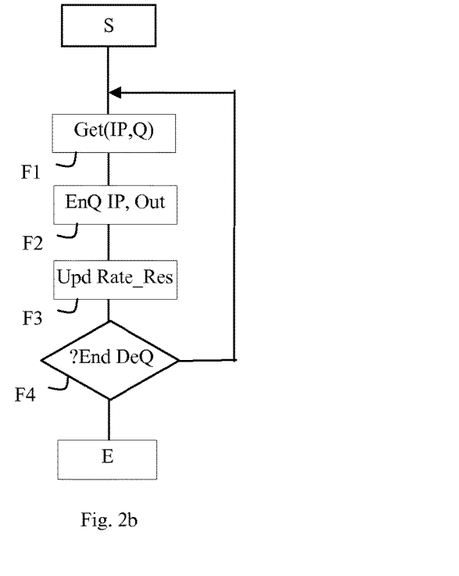

There now follows a description of the communication method, as it is implemented by the routing device 24 in a first particular embodiment, in relation to FIGS. 2a and 2b.

In this first embodiment, a cycle corresponds to a predetermined time, dependent on the bit rate available on the input link of the device.

FIG. 2a describes the steps of the communication method which are implemented by the routing device 24 to process a request D relating to a data segment to be routed over an output link from the routing device.

In a step E1, the routing device 24 obtains information relating to a volume of the requested data segment. In a particular embodiment, this information is associated with an identifier of the requested data segment.

In a step E2, the routing device 24 determines whether an input bit rate on the link L is above a threshold. The input bit rate on the link L corresponds to that needed for a reception, over this link, of a set of requested data segments. It is thus a bit rate expected in response to pending requests. In this first embodiment, the threshold corresponds to the bit rate available on the input link of the device.

If such is the case, that is to say that the expected reception of the data segments exceeds the threshold, in a step E3, the request to be routed is time-delayed, that is to say that it is not transmitted immediately. In a particular embodiment, the request D to be routed is stored in the queue 116.

Otherwise, in a step E4, the request D to be routed is transmitted immediately via the link L, more specifically to the output interface responsible for transmissions and receptions over the link L.

In a step E5, the routing device 24 updates the overall bit rate expected on the link L for all the pending requests.

This step E5 terminates the processing of the request D to be routed. On completion of these steps E1 to E5, the request to be routed has been either transmitted directly to the output interface, or time-delayed to be sent subsequently. Thus, the requests relating to data segments are transmitted directly as long as the expected input bit rate is lower than the bit rate available on the link L. Otherwise, the storage in the queue 116 makes it possible to time-delay the transmission of the requests causing the bit rate available at the input to be exceeded and thus regulate the transmission of these requests.

For its part, FIG. 2b describes the steps of the communication method which are implemented for a cycle to extract from the queue 116 requests that have been time-delayed, when a residual bit rate is available. The residual bit rate for the link L is determined as a function of the expected overall bit rate determined in the step E5 and of the bit rate available on the link L at the input.

In a step F1, the routing device 24 extracts from the queue 116 a time-delayed request, in order for it to be transmitted via the link L.

In a step F2, the extracted time-delayed request is transmitted immediately over the link L, more specifically to the output interface responsible for transmissions and receptions over the link L.

In a step F3, the routing device 24 updates the residual bit rate for the link L, as a function of the information relating to the volume of the requested data segment.

In a step F4, the routing device 24 determines whether any residual bit rate remains available on this cycle and whether any time-delayed requests remain. If such is the case, the method goes back to the step F1 of extraction from the queue.

Otherwise, the steps of the communication method F1 to F4 implemented for a cycle to transmit time-delayed requests by virtue of the residual bit rate are terminated.

Thus, over a cycle and for a link, the input bit rate corresponding to the bit rate needed for the reception of the data segments, for which requests are pending, does not exceed the bit rate available at the input of the routing device on this link.

In a first variant, in the step E2, when the request cannot be stored because of saturation of the queue 116, it is deleted. The request is also deleted from the pending requests table 112.

In a second variant, a validity time is associated with a time-delayed request. When the request is no longer valid, it is deleted from the queue 116 and from the pending requests table 112. It is stressed here that the time-delays for managing the queue 116 and the pending requests table 112 must be chosen consistently.

Figure 3A:
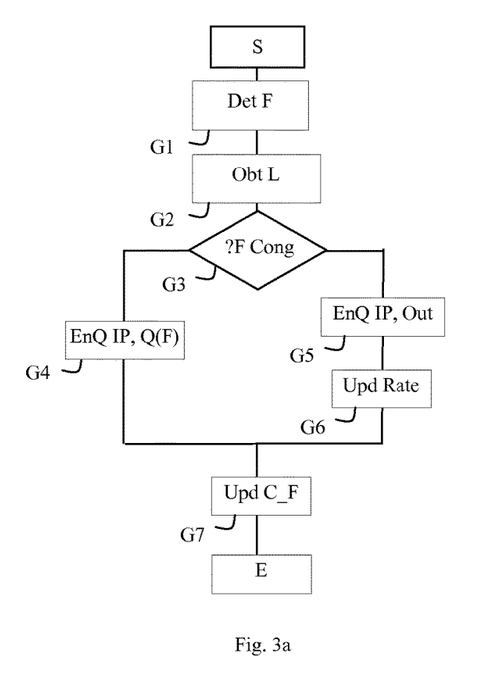
FIGS. 3a and 3b represent steps of the method according to a second particular embodiment of the invention.
Figure 3B:
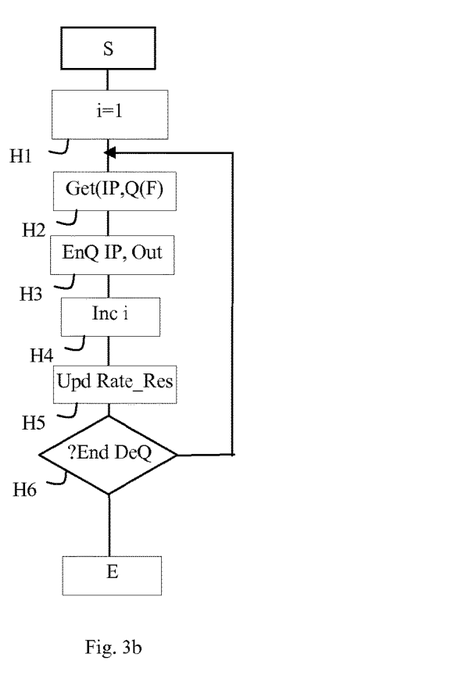

There now follows a description of the communication method, as it is implemented by the routing device 24 in a second particular embodiment, in relation to FIGS. 3a and 3b.

An active stream is a stream for which at least one request relating to a data segment of this stream has been transmitted. The pending requests table thus contains an identifier of a data segment of the stream.

Consequently, equitable bit rate r is the expression used to describe an equitable allocation of the available bit rate at the input of the device between the different active streams. It is understood that the equitable bit rate r is regularly reassessed as a function of the number of active streams.

A cycle in this second embodiment is inversely proportional to the equitable bit rate. The cycle corresponds to the time needed to process a request for each of the active streams.

FIG. 3a describes the steps of the communication method which are implemented by the routing device 24 to process a request D relating to a data segment to be routed over an output link from the routing device.

In a step G1, the routing device 24 identifies a stream F to which the requested data segment belongs.

In a step G2, the routing device 24 obtains information relating to a volume of the requested data segment. In a particular embodiment, this information is associated with an identifier of the requested data segment.

In a step G3, the routing device 24 determines whether an input bit rate on the link L for identified stream F is above a threshold. In this second embodiment, the threshold corresponds to the equitable bit rate. The input bit rate on the link L for the identified stream F corresponds to that needed for a reception, over this link, of a set of data segments requested for the identified stream. It is thus a bit rate expected in response to pending requests relating to data segments belonging to the identified stream.

If such is the case, that is to say that the expected reception of data segments belonging to the identified stream exceeds the equitable bit rate, in a step G4, the request to be routed is time-delayed, that is to say that it is not transmitted immediately. In a particular embodiment, the request D to be routed is stored in the queue 116.

Otherwise, in a step G5, the request D to be routed is transmitted immediately via the link L, more specifically to the output interface responsible for the transmissions and receptions over the link L.

In a step G6, the routing device 24 updates the expected overall bit rate on the link L for all the pending requests of the active streams.

In both cases, in a step G7, the routing device 24 updates the input bit rate for the identified stream F based on the information relating to the volume of the requested data segment.

This step G7 terminates the processing of the request D to be routed. On completion of these steps G1 to G7, the request to be routed has been either transmitted directly to the output interface, or time-delayed to be transmitted subsequently. Thus, the requests relating to data segments of a stream for which the expected input bit rate is lower than the equitable bit rate are transmitted directly. Otherwise, the storage in the queue 116 makes it possible to time-delay the transmission of the requests for the identified stream that exceed the equitable bit rate and thus regulate the transmission of these requests.

In a particular embodiment, a credit C(F) is associated with an active stream. When the stream becomes active, that is to say when an identifier of a data segment of the stream is the first of this stream to be stored in the pending requests table 112, the credit C(F) associated with the stream F is initialized with a quota Q(r) dependent on the equitable bit rate r and allocated to each stream. This quota Q(r) corresponds to the volume of data that the routing device can request for this link L and for each stream over a cycle and depends on the equitable bit rate r.

In the step G3, the input bit rate on the link L for the identified stream F is greater than the equitable bit rate when the credit C(F) is zero or when there is at least one time-delayed request.

In the step G7, the credit C(F) associated with the stream is reduced as a function of the information relating to the volume of the requested data segment. In a particular embodiment, if it becomes negative, then the credit C(F) is blocked at the zero value.

In parallel with these steps G1 to G7, the credits respectively associated with the active streams are incremented by the quota Q(r) for each cycle, the quota depending on the equitable bit rate r.

In this embodiment as described, the credit C(F) can not be negative. This notably makes it possible not to penalize the next cycle of the streams for which the requests are received in bursts. Video streams are, for example, streams of this type. In another embodiment, the credit C(F) can take a negative value.

For its part, FIG. 3b describes the steps of the communication method which are implemented for a cycle to extract from the queue 116 requests that have been time-delayed, when a residual bit rate is available. The residual bit rate for the link L is determined as a function of the expected overall bit rate determined in the step G6 and of the bit rate available on the input link L.

In a particular embodiment, the queue 116 is partitioned, in order to obtain a queue for each active stream.

In a step H1, a counter i is initialized to point to the queue associated with the first active stream which has time-delayed requests.

In a step H2, the routing device 24 extracts, from the queue associated with the ith active stream, a time-delayed request, in order for it to be transmitted over the link L.

In a step H3, the extracted time-delayed request is transmitted immediately over the link L, more specifically to the output interface responsible for transmissions and receptions over the link L.

In a step H4, the counter i is incremented and points to the next active stream, for which at least one request is time-delayed.

In a step H5, the routing device 24 updates the residual bit rate for the link L, as a function of the information relating to the volume of the requested data segment.

In a step H6, the routing device 24 determines whether there is any remaining residual bit rate available on this cycle and whether there are any active streams remaining. If such is the case, the method returns to the step H2 of extraction from the queue.

Otherwise, the steps of the communication method H1 to H6 implemented for a cycle to transmit the time-delayed requests using the residual bit rate are terminated.

In a particular embodiment, the residual bit rate is divided up between the regulated active streams, that is to say those that have time-delayed requests.

The first and second variants described in relation to the first embodiment are also applicable to this second embodiment for the management of the queues associated with each active stream.

Figure 5A:
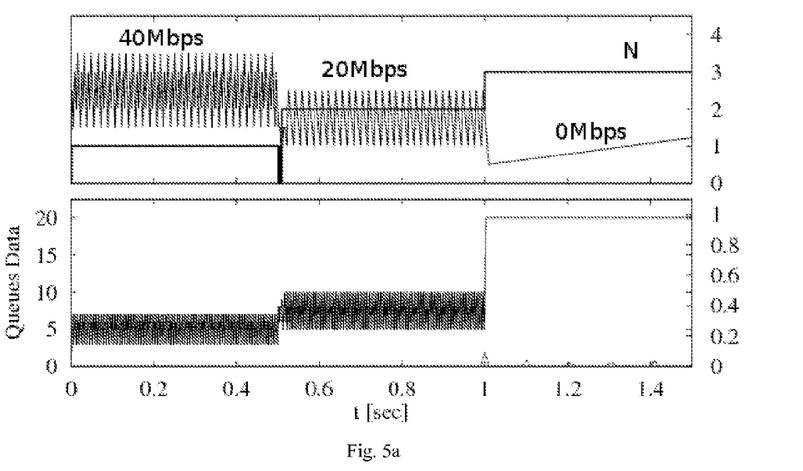
FIGS. 5a and 5b illustrate results respectively obtained according to the prior art and by virtue of the communication method in the second embodiment.
Figure 5B:
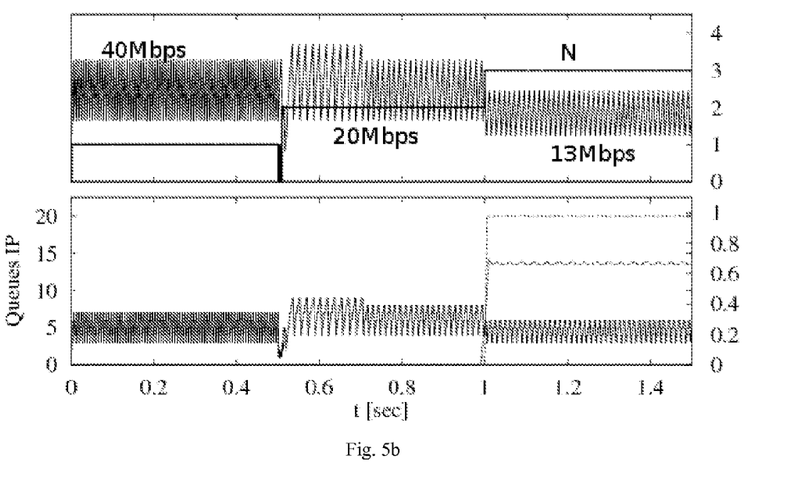

As an illustration, results obtained respectively for a method according to the prior art and using the communication method according to this second embodiment are represented in FIGS. 5a and 5b.

A simple case is assumed in which three streams are active. The first and second streams, represented by solid lines, are streams for which the respective bit rate is controlled by the client entity; they represent for example an application session or a file transfer. A third stream, represented by broken lines, is a "greedy" stream, that is to say a stream with no bit rate control, constantly requiring a high bit rate. In this example, the second stream appears after 0.5 second and the third stream appears after one second.

The capacity of the link L is forty megabytes per second.

FIG. 5a illustrates the results obtained with a method according to the prior art, that is to say with a queue for the data segments, dimensioned to store twenty data segments. The first graph of FIG. 5a shows the trend of the input bit rate of the first and second streams. Between 0 and 0.5 second, the input bit rate of the first stream is of the order of the link bit rate. It will be noted that, upon arrival of the second stream, the input bit rate of the first and second streams corresponds to the equitable bit rate with two active streams, i.e. twenty megabytes per second. Upon arrival of the third stream, the input bit rates of the first and second streams tend toward zero. In effect, since the first and second streams are controlled in terms of bit rate, the requests are adjusted by the client entities as a function of what can be offered. The second graph of FIG. 5a represents the trend of the number of data segments stored in the queue. Before the appearance of the second stream, this number is of the order of five data segments. After the appearance of the second stream and before that of the third stream, this number is of the order of seven. After the appearance of the third stream, this number reaches the maximum size of the queue and essentially comprises data segments of the third stream. A loss rate among the data segments for the third stream is almost zero. The third stream thus consumes virtually all of the available input bit rate.

FIG. 5b illustrates the results obtained with the communication method according to the second embodiment. For each of the active streams twenty requests can be stored in the queue. The first graph of FIG. 5b represents the input bit rate trend of the first and second streams. It will be noted that, upon arrival of the second stream, the input bit rate of the first stream reduces but remains at the equitable bit rate (of the order of twenty megabytes per second). The same applies upon the arrival of the third stream: the bit rates of the first and second streams are of the order of thirteen megabytes per second. The second graph of FIG. 5b represents the trend of the number of requests stored in the queue for each of the three streams. Before the appearance of the second stream, this number is of the order of five requests for the first stream. Then, between 0.5 and one second, that is to say before the appearance of the third stream, this number is of the order of seven requests for the first and second streams. After the appearance of the third stream, this number remains substantially equal for the first and second streams. For the third stream, the number of requests stored in the queue reaches the maximum value (twenty requests) and a loss rate of seventy percent of the requests is reached for the third stream.

It is thus found, for this illustrative example, that the requests of the first and second streams are protected as long as the input bit rate for these streams is below the equitable bit rate. The requests of the first and second streams are also protected from those of the third stream ("greedy").

There now follows a description of a routing device in a particular embodiment of the invention with reference to FIG. 4. Such a device 20 is arranged to process data segments belonging to different streams and comprises:

the routing table 110 FIB described previously;

the pending requests table 112 PIT described previously;

the storage means 114 or content store described previously;

the queue 116, described previously;

a communication module 100 with the other devices of the communication network, arranged to transmit data, notably requests relating to data segments belonging to a stream, and to receive data segments;

a module 102 for processing requests relating to data segments in relation to the pending requests table 112, arranged notably to determine whether a request relating to a data segment is already pending and, if appropriate, update the pending requests table, to route a request using the routing data stored in the routing table 110 and transmit the data segments to the client entities that have requested them using the pending requests table 112;

a module 104 for determining an input bit rate for said link;

a comparison module 106, arranged to compare the determined input bit rate with a threshold;

a module 108 for managing the queue 116.

The modules for determining 104, comparing 106 and managing 108 the queue are activated to process a request relating to a data segment of a given stream, to be routed via a link to the routing device 20.

The module 104 for determining the input bit rate is then arranged to determine the bit rate needed for a reception, by means of the link, of the data segment corresponding to the request to be routed and also of a set of data segments corresponding to pending requests.

The module 108 is notably arranged to store a time-delayed request in the queue 116, in the case of a positive check by the comparison module 104.

The determination module 104 is further arranged to determine a residual bit rate available for a cycle, based on the bit rate available on the input link and the bit rate needed for the reception of the data segments associated with the pending requests. As a function of the residual bit rate, the module 108 is arranged to extract, from the queue 116, at least one request relating to a data segment.

It should be recalled here that, in the first embodiment, the threshold corresponds to the bit rate available on the input link of the device.

In the second embodiment, the threshold corresponds to the equitable bit rate. In this second embodiment, the determination module 104 is arranged to determine the input bit rate for each stream and the comparison module 106 is arranged to compare the input bit rate of the stream, to which the request currently being processed relates, with the equitable bit rate.

The modules 102, 104, 106, 108 are arranged to implement the method previously described. They are preferably software modules comprising software instructions for having the steps of the method described previously executed, implemented by the routing device. The invention therefore relates also to:

a program for a routing device, comprising program code instructions intended to control the execution of the steps of the method described previously, when said program is run by said device;

a storage medium that can be read by a routing device on which the program for a routing device is stored.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention relates also to a communication network comprising at least one routing device as described previously.

An exemplary embodiment aims to remedy inadequacies/drawbacks of the prior art and/or to provide enhancements thereto.

Although the present disclosure has been described with reference to one or more examples, workers skilled in the art will recognize that changes may be made in form and detail without departing from the scope of the disclosure and/or the appended claims.

The invention claimed is:

1. A communication method comprising:
   processing, by a routing device in an information-centric communication network, a request concerning a data segment of a given stream, said request having to be routed by the routing device over a link from the routing device to another device of the network from which the requested data segment will be received, wherein the processing comprises the following acts:
   checking whether an input bit rate for said link is above a threshold, the input bit rate for said link corresponding to that needed for reception by the routing device by using said link of the requested data segment and of a set of data segments corresponding to pending requests; and
   time-delaying said request to be routed if the input bit rate for said link is above the threshold.

2. The communication method as claimed in claim 1, further comprising obtaining information relating to a volume of the requested data segment.

3. The communication method as claimed in claim 1, in which said threshold corresponds to the bit rate available on said link at the input of said device.

4. The communication method as claimed in claim 1, in which the input bit rate is determined for the pending requests relating to data segments of the given stream and said threshold corresponds to an equitable bit rate.

5. The communication method as claimed in claim 4, comprising:
   for an active stream, incrementing a credit allotted to said active stream as a function of the equitable bit rate, and
   decrementing the credit allotted to the given stream as a function of information relating to a volume of the requested data segment.

6. The communication method as claimed in claim 4, in which said checking comprises checking that the given stream has exceeded the equitable bit rate or that at least one request of the given stream is time-delayed.

7. The communication method as claimed in claim 1, in which the time-delaying act comprises storing the request to be routed in a queue, and in extracting said request to route it over said link as a function of a residual bit rate, determined as a function of the input bit rate on said link.

8. The communication method as claimed in claim 7, in which the residual bit rate is divided up between the active streams having time-delayed requests.

9. A routing device in an information-centric communication network, comprising means, activated for process a request relating to a data segment of a given stream, said request having to be routed by the routing device over a link from the routing device to another device of the network from which the requested data segment will be received, said means for processing comprising:

means for determining an input bit rate for said link, the input bit rate for said link corresponding to that needed for reception by the routing device by using said link of said requested data segment and of a set of data segments corresponding to pending requests;

checking means, arranged to check whether the input bit rate is above a threshold;

time-delay means, arranged to time-delay said request to be routed if the input bit rate for said link is above the threshold.

10. A communication network comprising at least one routing device as claimed in claim 9.

11. A non-transitory storage medium that can be read by a routing device on which a program is stored, wherein the programs comprises program code instructions configured to control execution of a method, when said program is run by said routing device in an information-centric communication network, said method comprising the following acts implemented to process a request concerning a data segment of a given stream, said request having to be routed by the routing device over a link from the routing device to another device of the network from which the requested data segment will be received:

checking whether an input bit rate for said link is above a threshold, the input bit rate for said link corresponding to that needed for reception by the routing device by using said link of the requested data segment and of a set of data segments corresponding to pending requests; and time-delaying said request to be routed if the input bit rate for said link is above the threshold.

* * * * *

UNITED STATES PATENT AND TRADEMARK OFFICE
CERTIFICATE OF CORRECTION

PATENT NO. : 9,729,435 B2
APPLICATION NO. : 14/404789
DATED : August 8, 2017
INVENTOR(S) : Luca Muscariello et al.

It is certified that error appears in the above-identified patent and that said Letters Patent is hereby corrected as shown below:

In the Claims

Column 12, Line 62, delete "process", insert --processing--.

Column 13, Line 15, delete "programs", insert --program--.

Signed and Sealed this
Nineteenth Day of March, 2019

Andrei Iancu
*Director of the United States Patent and Trademark Office*